3,560,471
PROCESS FOR DEASHING POLYMERS
Joseph Di Pietro, West Millington, N.J., assignor to
 Celanese Corporation, New York, N.Y.
No Drawing. Continuation of application Ser. No.
 597,576, Nov. 29, 1966. This application Oct. 10,
 1969, Ser. No. 866,148
Int. Cl. C08f 3/02, 3/06, 3/10
U.S. Cl. 260—93.7                          6 Claims

ABSTRACT OF THE DISCLOSURE

The deashing of polymers, and in particular polyolefins, by means of treatment with secondary and tertiary organic phosphites.

This application is a continuation of Ser. No. 597,576 filed Nov. 29, 1966, now abandoned.

DISCLOSURE

Numerous processes for the production of high molecular weight polymers yield crude reaction products that contain impurities which are difficult to separate from the polymer and adversely affect its properties. In particular, in several important moderate-temperature and pressure processes for olefin polymerization, catalysts comprising various metallic or other ash-yielding compounds are employed. Exemplary of such catalysts are chromium oxide supported on a carrier comprising silica, alumina, thoria, and/or zirconia as described in U.S. Patent 2,825,721, and Ziegler-Natta type catalysts as described in Belgian Patent Nos. 536,617 and 538,782. The use of such "heterogenous ionic" catalysts is very desirable since they are capable of yielding polymers which are considerably less branched than polymers obtained by means of the older free radical-yielding catalysts, and which have higher molecular weight, a greater degree of crystallinity, greater rigidity and hardness, and higher tensile strength.

The use of these catalysts unfortunately also results in the occlusion of certain residues in the polymer which may result in undesirable color and odor. Additionally these residues tend to render the polymer more susceptible to decomposition, particularly thermal decomposition, and may cause corrosion of equipment. As the ash content increases, the melt stability of any given polymer decreases and vice versa. Purity is particularly critical for the production of good fibers and films from these polymers.

Although it is possible to substantially reduce these residues using, for example, filtration and centrifugation techniques, such techniques are often difficult and expensive to carry out.

One of the most widely used methods of deashing polyolefins produced in the above manner consists of treating the polymer slurry with an alcohol such as isopropanol and a mineral acid such as hydrochloric acid, followed by exhaustive washing with steam and water. (See for example British Patent 852,929.) Generally a polymer of about 200 p.p.m. ash content can be isolated by this procedure. The highly corrosive nature of this system requires high capital and maintenance costs. Other suggested methods, employing for example (1) steam distillation followed by leaching in weak aqueous ammonia, (2) metal complexing agents and (3) adsorption techniques, produce polymers of similar ash content.

It is an object of this invention to deash polymers to such an extent that they contain less than 100 p.p.m. ash content. It is a further object of this invention that the method be simple and inexpensive and without harm to the polymer itself. These objects have now been met by the process which broadly comprises adding a secondary or tertiary organic phosphite to the polymer dispersed in a suitable medium, filtering the resulting mixture, and then washing the resulting filter cake with a polar solvent.

It has been proposed in U.S. Patent 3,264,277 (Winkler et al.) to add organic phosphites to a Ziegler-Natta catalyst-containing polymerization mixture prior to reaction for the purpose of increasing the crystallinity, particularly at high reaction temperatures. In this method, the added phosphite affects the course of the polymerization step itself and the nature of the polymer produced thereby. The organic phosphite can have the deterimental effect of itself acting as a chain terminator and also tends to deactivate the catalyst. Moreover the organic phosphite initially added is essentially consumed during the reaction by chain termination and/or by oxidation to the phosphate. The polymers resulting from such a process have an undesirably high ash content. By the process of my invention the polymer is not deliteriously affected and the ash content is reduced to less than 100 p.p.m.

While the method of this invention can be practiced with ash-containing polymers in general, it is particularly beneficial with polyolefins and especially so with poly (alpha-mono-olefins) containing 2 to 6 carbon atoms. Exemplary of such materials are polymers of ethylene, propylene, butene-1 and 3-methyl butene-1. Copolymers of these olefinic monomers are also contemplated. These polymers and copolymers are most desirably produced by a polymerization process employing Ziegler-Natta type catalysts. Such processes are well known in the art. Ziegler-Natta catalysts are generally composed of two components, a transition metal halide and an organic metallic compound. The organic metallic compound comprises an alkyl or monohalo alkyl compound and a metal of the 1st to 3rd columns of the periodic table (Mendeleev). Lithium, berylium, magnesium, zinc and aluminum are exemplary of such compounds. The most commonly employed organic metallic compounds are aluminum alkyls in which the alkyl groups contain from 1 to 10 carbon atoms. The term aluminum alkyl is to be understood to include mono- and di-alkyl aluminum mono- and dihalides, as well as aluminum trialkyls. Typical of such aluminum alkyls are diethyl aluminum chloride, triethyl aluminum and triisobutyl aluminum.

The transition metal halides contemplated are those of metals belonging to Groups IV–VI, inclusive, of the Mendeleev Periodic Table. Exemplary of such metals are titanium, zirconium, hafnium and vanadium. The preferred transition metal halides are titanium trihalides, particularly titanium trichloride. Titanium trichloride can be conveniently prepared by the reduction of titanium tetrachloride with a metal alkyl compound, particularly aluminum metal, at elevated temperatures.

The secondary and tertiary organic phosphites which are utilizable in the process of this invention include both aliphatic and aromatic phosphites. Alkyl phosphites are the preferred additives of this invention. Exemplary of these phosphites are di-n-butyl phosphite, trilauryl phosphite, diphenyl phosphite, triphenyl phosphite and trinapthyl phosphite.

These organic phosphites are added to the polymer slurry at the end of the polymerization reaction. The polymer is preferably dispersed in an inert medium. Suitable inert solvents are dichloromethane, cyclohexane, n-pentane, n-heptane and the like. Preferably, the organic phosphite itself is dissolved in a solvent, particularly a polar solvent. The preferred solvent is a methylene chloride-methanol mixture. The amount of organic phosphite added to the polymer slurry should be from about 0.3 to 3 parts by weight per 100 parts by weight of crude polymer. After the organic phosphite is added, the mixture is agitated and filtered. In a preferred embodiment the mixture, before filtering, is heated from about 30 to 60° C. This warming procedure, although not an absolute requirement, maximizes ash removal. The filter cake is then washed, preferably several times, with a wash solvent. Suitable wash solvents are lower alkanols such as methanol, ethanol and propanol and alkanol-containing mixtures such as methanol-methylene chloride and the like.

The following examples illustrate the process of this invention. The exemplary polymer employed is poly (3-methyl butene-1) obtained by the steriospecific polymerization of the monomer with a conventional catalyst system consisting of titanium trichloride, aluminum trichloride, diethyl aluminum chloride and butyl lithium. The weight ratio of catalyst to monomer is 1:1,000.

Example I 500 grams of the above-described 3-methyl butene-1 polymer was dispersed in one gallon of n-heptane. 4.5 grams of di-n-butyl phosphite dissolved in 100 cc. of a 1:1 methylene chloride-methanol solution was added to this polymer slurry. The mixture was stirred and warmed to 35–40° C. and was filtered. The filter cake was washed with three 200 cc. portions of methanol and the resultant water-white polymer was dried under vacuum. The total ash content was 56 p.p.m.

Example II

The procedure of Example I was followed employing however 4 grams of trilauryl phosphite instead of the di-n-butyl phosphite. The resultant polymer contained 80 p.p.m. total ash content.

Example III

The procedure of Example I was followed employing a mixture of 2.5 grams of trilauryl phosphite and 2.4 grams of di-n-butyl phosphite in place of the 4.5 grams of di-n-butyl phosphite. Upon analysis, the resultant polymer contained 80 p.p.m. total ash content.

Example IV

The procedure of Example I was followed except that the mixture was not warmed to 35–40° C. but rather was kept at room temperature. The total ash content of the resultant polymer was 90 p.p.m.

It is thus apparent from the above examples that the ash content of a polymer can be reduced to less than 100 p.p.m. when said polymer is treated in accordance with the method of this invention.

Numerous other variants of the above procedure will be apparent to one skilled in the art within the spirit of the present invention.

What is claimed is:
1. A process for removing ash from a 3-methyl butene-1 polymer prepared in the presence of an ash-yielding catalyst composed of a first organic metallic compound component selected from the group consisting of aluminum trialkyls and alkyl aluminum halides and a second transition metal halide compound component selected from the group consisting of titanium trihalides which comprises forming a dispersion by adding a secondary or, tertiary organic phosphite selected from the group consisting of di-n-butyl phosphite, trilauryl phosphite and mixtures thereof, in an amount of 0.3 to 3 parts to 100 parts of said polymer by weight, to said polymer dispersed in a suitable medium; filtering said dispersion to form a polymer filter cake and washing said filter cake with a polar solvent to separate the solubilized residue and the phosphite compound from the polymer to produce a 3-methyl butene-1 polymer having an ash content of less than 100 parts per million.

2. The process of claim 1 wherein the organic phosphite is di-n-butyl phosphite.

3. The process of claim 1 wherein the organic phosphite is trilauryl phosphite.

4. The process of claim 1 wherein prior to filtration said mixture is heated to a temperature of about from 30 to 60° C.

5. The process of claim 1 wherein said phosphite is added in the form of a solution with methylene chloride and methanol.

6. The process of claim 1 wherein said washing solvent comprises a lower alkanol.

References Cited

UNITED STATES PATENTS

| 3,264,277 | 8/1966 | Winkler et al. | 260—93.7 |
| 3,308,105 | 3/1967 | Hoyt et al. | 260—93.7 |

FOREIGN PATENTS

| 1,021,571 | 12/1957 | Germany | 260—94.9 |

JAMES A. SEIDLECK, Primary Examiner

U.S. Cl. X.R.
260—88.2, 94.9